United States Patent [19]

Ichinose

[11] Patent Number: 5,036,686
[45] Date of Patent: Aug. 6, 1991

[54] STEERING WHEEL LOCK DEVICE

[75] Inventor: You Ichinose, Aichi, Japan

[73] Assignee: Kabushiki Kaisha Tokai Rika Denki Seisakusho, Aichi, Japan

[21] Appl. No.: 498,974

[22] Filed: Mar. 26, 1990

[30] Foreign Application Priority Data

Mar. 28, 1989 [JP] Japan ................................. 1-35840

[51] Int. Cl.⁵ ............................................ B60R 25/02
[52] U.S. Cl. ........................................ 70/186; 70/252
[58] Field of Search .......................... 70/252, 182–186, 70/386

[56] References Cited

U.S. PATENT DOCUMENTS

| 3,673,829 | 7/1972 | Mizuno | 70/252 |
| 3,739,610 | 6/1973 | Kuroki | 70/252 |
| 3,782,145 | 1/1974 | Wolter | 70/252 X |
| 3,789,636 | 2/1974 | Nakashima | 70/252 |
| 4,433,562 | 2/1984 | Tsuchiya | 70/252 X |
| 4,495,786 | 1/1985 | Masaki et al. | 70/186 |
| 4,771,619 | 9/1988 | Shiramizu et al. | 70/186 |
| 4,905,487 | 3/1990 | Morikawa et al. | 70/252 X |

FOREIGN PATENT DOCUMENTS 60-246969 12/1985 Japan .
22116 10/1898 United Kingdom ................ 70/185

Primary Examiner—Lloyd A. Gall
Attorney, Agent, or Firm—Finnegan, Henderson, Farabow, Garrett and Dunner

[57] ABSTRACT

A steering wheel lock device comprises a key rotor, a cam shaft, a lock member which is reciprocated between a locking position to lock a steering wheel and unlocking position to unlock the steering wheel in association with rotation of the lock cam, a regulating lever for preventing the turning of the key rotor from the unlocking position to the locking position, an operating member for allowing rotation of the key rotor from unlocking position to the locking position, and holding means which, when the operating member is moved from an original position thereof to a predetermined position, holds the operating member at the predetermined position.

The steering wheel lock device also includes a slide piece for causing the operating member to return from the predetermined position to the original position against the holding means.

3 Claims, 7 Drawing Sheets

STEERING WHEEL LOCK DEVICE

FIELD OF THE INVENTION

The present invention relates to a steering wheel lock device.

BACKGROUND OF THE INVENTION

A conventional steering wheel lock device of this type is designed as follows. When the key is turned between a plurality of unlocking positions, for instance "ON" and "ACC", the turning of the key is controlled by a regulating lever. Consequently, the key may not be turned to the locking position after the automobile has stopped. Therefore, the operator must turn the key while depressing a push button to turn the regulating lever thereby releasing the key.

With the above-described conventional steering wheel lock device, the key rotor can be turned to the locking position only when the key is turned while the push button is depressed. Therefore, the depression of the push button and the turning of the key must be carried out with only one hand. Thus, the operation of the device is rather troublesome; that is, the conventional steering locking device is low in operability.

For example, a conventional steering wheel lock device has been disclosed by Japanese Patent Unexamined publication No. 246969/1985. In this prior art, as shown in FIGS. 11, 12, 13, and 14, a manually operated latch 112 is slidably provided in parallel with an axis of a rotating member 105. The latch lever 112 has a projection 112a directed toward a rotating member 105. A coaxial groove is provided on a cylindrical outer surface of the rotating member 105 and the projection 112a slides along the groove. The groove comprises two sections, that is, a first section 115 and a second section 116, provided away from each other in both the axial and circumferential directions of the rotating member 105 and connected with each other through a junction groove. The projection 112a is engaged with the first groove 115 or the second groove 116 and slides therebetween as desired. This prior art arrangement achieves a dual operation mechanism. Therefore, it is not always necessary to perform the movement of the operating member and the rotation of the key rotor at the same time.

In this arrangement, however, when the rotating member is not suitably fitted in the axial direction, it is difficult to determine relative positions between the projection 112a and the grooves. Therefore the operation of this device becomes troublesome. In order to eliminate theses defects, the rotating member 105 must be located on a suitable position in the axial direction. Therefore, precision thereof must be improved. As a result, this prior art device is difficult to manufacture and install.

SUMMARY OF THE INVENTION

An object of this invention is to provide a steering wheel lock device in which a regulating lever which regulates the rotation of a key rotor thereby preventing the key from being turned to the locking position carelessly, is rotatably provided. Consequently, the key can be turned to the locking position with high operability.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the steering wheel lock device according to the present invention comprises: a housing; a key rotor which is rotatable with respect to the housing, and which is allowed to turn from a locking position, in which a steering wheel is locked, to an unlocking position, in which a steering wheel is unlocked, upon insertion of a key into the key rotor, wherein the key can be inserted into or removed from the key rotor while the key rotor is in the locking position; a cam shaft coupled to the key rotor so as to be rotated in association with the key rotor, the cam shaft having a lock cam and a regulating cam which are formed in an outer cylindrical wall of the cam shaft; a lock member which is reciprocated between the locking position and the unlocking position in association with the lock cam; a regulating lever rotatably provided in the housing in such a manner that, when the key rotor is at the locking position, one end portion of the regulating lever is disengaged from a cam recess of the regulating cam, thus permitting rotation of the key rotor, and when the key rotor is turned to the unlocking position, the regulating lever is turned in one direction by a spring means so that the one end portion of the regulating lever is confronted with the cam recess of the regulating cam, thus preventing the turning of the key rotor from the unlocking position to the locking position; an operating member provided in the housing in such a manner that the operating member is confronted with the other end portion of the regulating lever, and that, when the operating member is moved, the regulating lever is turned in a direction opposite the one direction against the elastic force of said spring means so that the one end portion of the regulating lever is disengaged from the cam recess of the regulating cam, thus allowing rotation of the key rotor from the unlocking position to the locking position; holding means which holds the operating member at said predetermined position upon movement of the operating member from an original position thereof to a predetermined position; means for causing said operating member to return from the predetermined position to the original position against the holding means.

When the operating member is moved to the predetermined position with the key rotor at the unlocking position, the operating member is held there by the holding means, as a result of which the one end portion of the regulating lever is disengaged from the cam recess of the regulating cam, thus allowing rotation of the key rotor from the unlocking position to the locking position. Hence, it is not always necessary to perform the movement of the operating member and the rotation of the key rotor at the same time. That is, the key rotor may be turned after the movement of the operating member. Thus, the steering wheel lock device of the invention is simpler in operation, and excellent in operability.

BRIEF DESCRIPTION OF THE DRAWINGS

The accompanying drawings, which are incorporated in and constitute a part of this specification, illustrate one embodiment of the present invention and together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings. Whenever possible, the same reference number will be used throughout the drawings to refer to the same or like parts.

Figure 1:
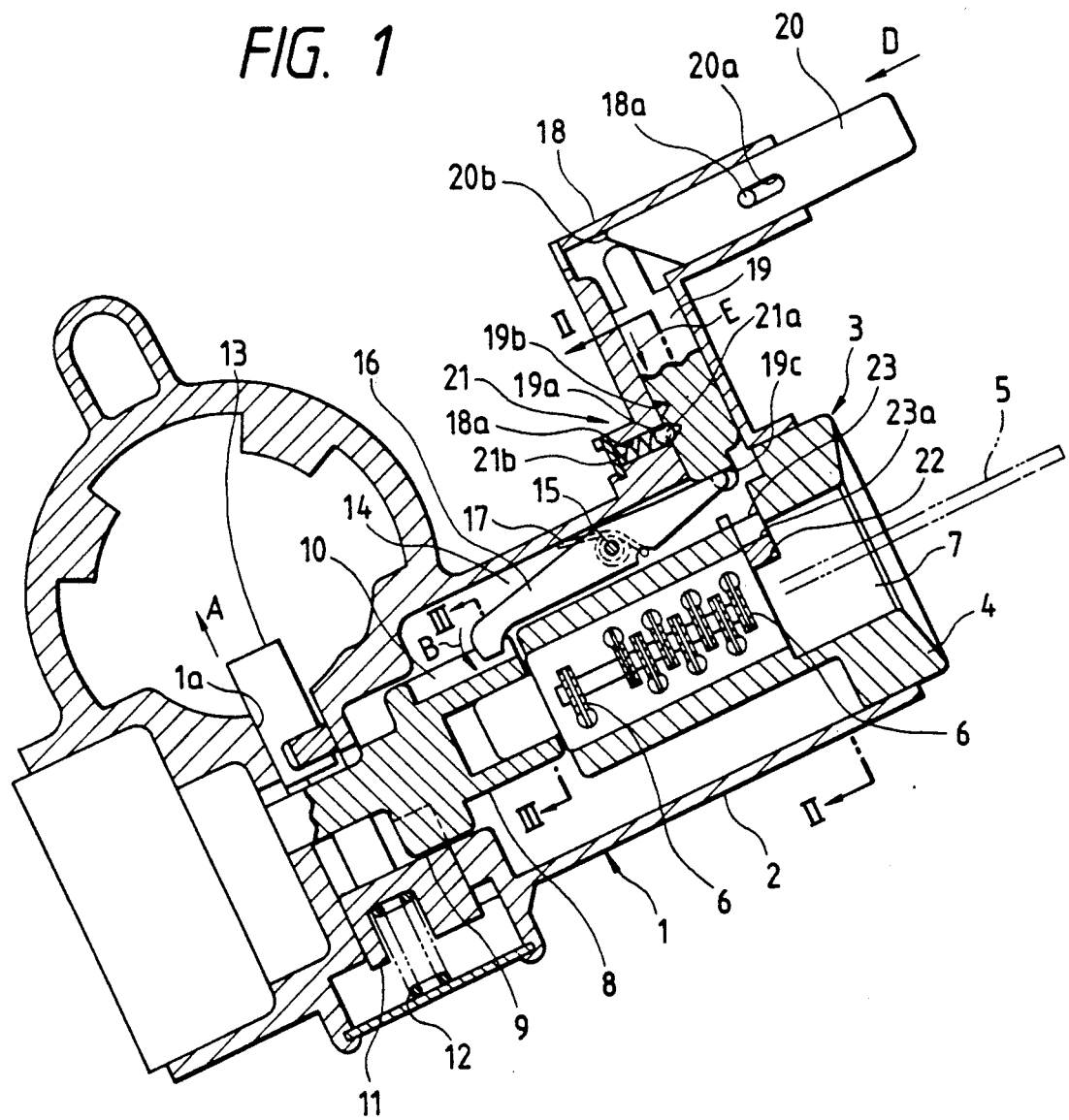
FIG. 1 is a cross sectional view of one operating condition of a steering wheel lock device according to the invention.

In FIG. 1, reference numeral 1 designates a housing fixedly secured to a steering column (not shown). A key cylinder 3 is inserted into a cylindrical part 2 of the housing 1. The key cylinder 3 comprises a key rotor 7 inserted into a lock cylinder 4, the key rotor 7 being turned when a plurality of tumblers 6 are moved by a key 5 inserted thereinto. A cam shaft 8 is coupled to the rear end of the key rotor 7, and an ignition switch (not shown) is coupled to the rear end (left end) of the cam shaft 8. A lock cam 9 is formed in the outer wall of the left end portion of the cam shaft 8, and a regulating cam 10 is formed in the outer wall of the right end portion of the cam shaft 8. Reference numeral 11 designates a movable frame which is driven by the lock cam 9, the movable frame forming a lock member. The movable frame 11 is so arranged that it is movable in the direction of the arrow A and in the opposite direction. Further in FIG. 1, reference numeral 12 designates a coil spring urging the movable frame 11 in the direction of the arrow A; and 13, a lock bar coupled to the movable frame 11, the lock bar 13 forming the lock member. The lock bar 13 is slidably supported on the inner wall of a supporting portion 1a of the housing 1. When the lock bar 13 is moved in the direction of the arrow A, its end is engaged with a lock groove formed in a steering shaft (not shown), thereby preventing the rotation of the steering shaft. A groove 14 is formed in the inner wall of the housing 3 into which the key cylinder 3 is inserted. In the groove 14, a regulating lever 16 is rockably mounted on a pin 15 and is urged in the direction of the arrow B by a torsion coil 17 wound on the pin 15 so that the left end of the regulating lever 16 is confronted with the outer surface of the regulating cam 10.

Figure 3:
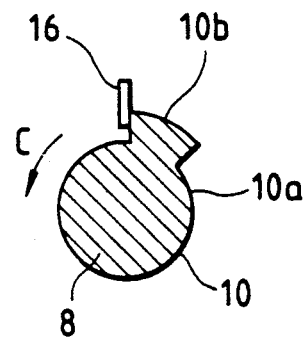
FIG. 3 is also a sectional view taken along line III—III in FIG. 1.

As shown in FIG. 3, the regulating cam 10 is made of a cam recess 10a and a cam protrusion 10b which are formed in its outer surface. When the key rotor 7 is turned to the unlocking positions; i.e., the "ACC", "ON" and "START" positions, the left end of the regulating lever 16 is confronted with the cam recess 10a; and when it is turned to the "LOCK" position, the left end of the regulating lever 16 is caused to ride on the cam protrusion 10b.

Further in FIG. 1, reference numeral 18 designates a substantially L-shaped cylindrical support which is formed integral with the outer cylindrical wall of the housing 1. The cylindrical support 18 is communicated with the cylinder 2. An operating member 19 and a push button 20 are slidably provided in the cylindrical support 18. The right end of the regulating lever 16 is engaged with a recess 19c which is formed substantially in the central portion of the deep end of the operating member 19. The lock cylinder 4 has a cylindrical portion 4a which is brought into communication with the deep end of the cylindrical support 18. The cylindrical portion 4a of the lock cylinder 4 is in communication with the outer wall of the key rotor 7. An elongated hole 20a is formed in the middle portion of the push button 20. A pin 18a embedded in the support 18 is engaged with the elongated hole 20a thus formed so that the push button 20 may not come off the support 18. The deep end of the push button 20 is a sloped surface 20b of about 45°. The other end of the operating member 19, which is away from the regulating lever 16, is engaged with the sloped surface 20b. A side hole 18b is formed in the side wall of the support 18, and holding means 21 consisting of a ball 21a and a coil spring 21b is provided in the side hole 18b. Two recesses 19a and 19b are formed in the operating member 19 in such a manner that they confront with the holding member 21. A cam recess 22 is formed in the outer cylindrical wall of the key rotor 7 so that it is confronted with the deep end of the support 18 and the cylindrical portion 4a when the key rotor 7 is turned to the "ACC" position. The cylindrical portion 4a has a slide piece 23 which is moved by the cam recess 22. The slide piece 23 has a recess 23a which is a relief for the other end of the regulating lever 16.

Figure 10:
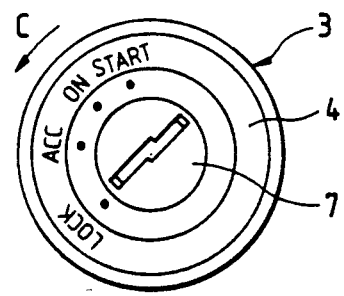
FIG. 10 is a front view of a key cylinder.
Figure 11:
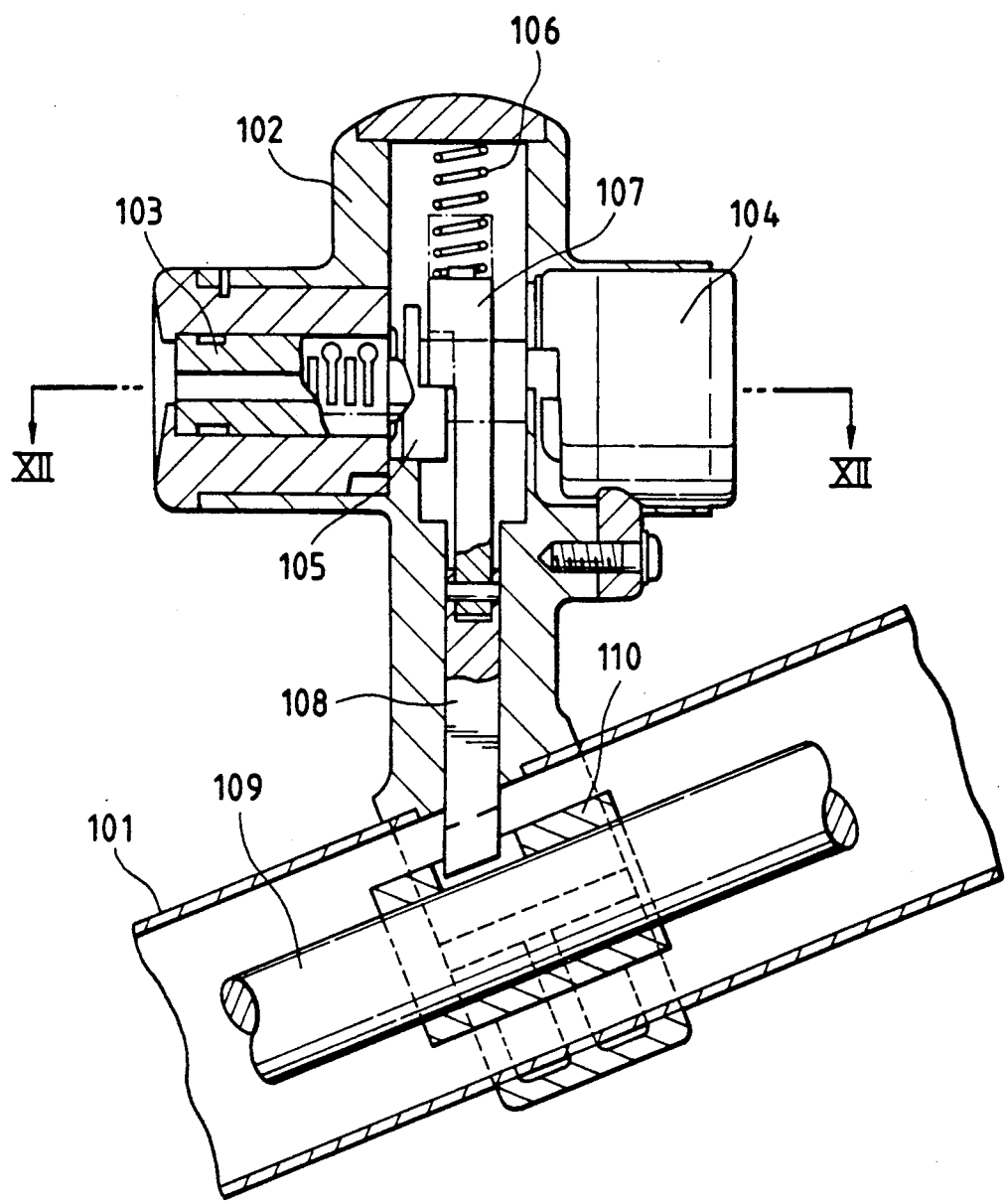
FIGS. 11-14 show a conventional steering wheel lock device.
Figure 12:
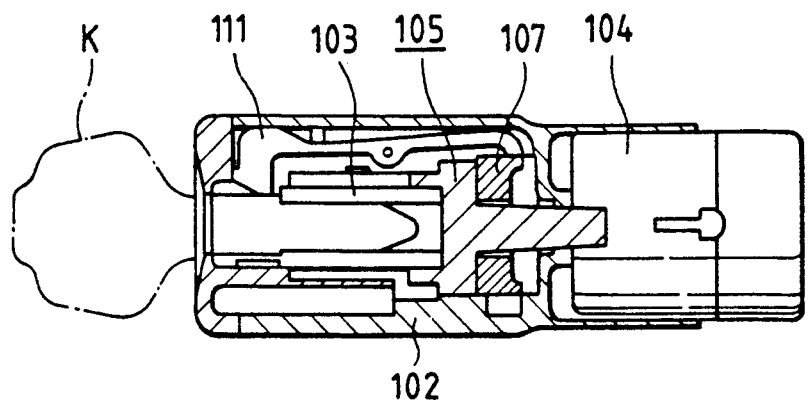
Figure 13:
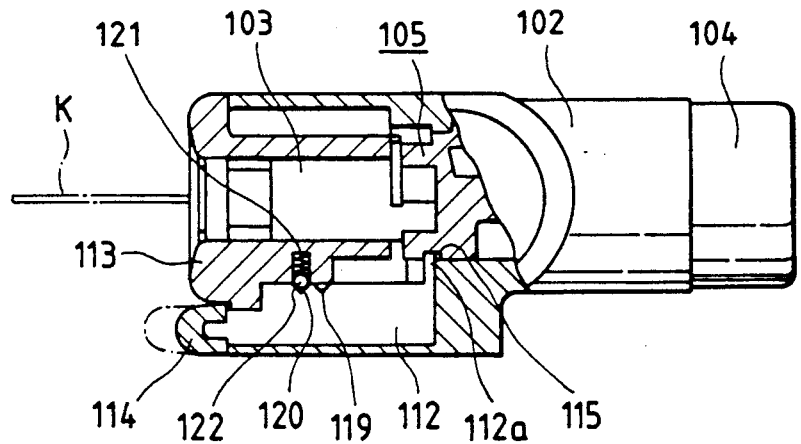
Figure 14:
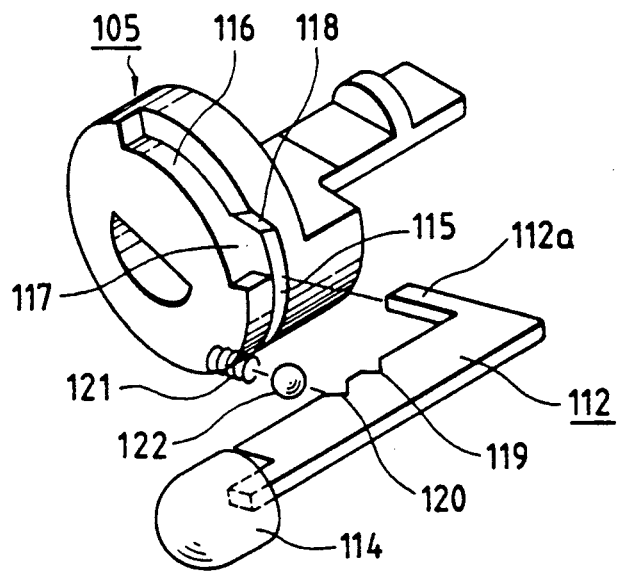

When the key rotor 7 is turned to the "LOCK" position as shown in FIG. 10, the key 5 can be inserted into or removed from the key rotor 7. With the key 5 inserted into the key rotor 7, the key rotor 7 can be turned to the unlocking positions; i.e., the "ACC", "ON" and "START" positions.

The operation of the steering wheel lock device thus constructed will be described.

Figure 9:
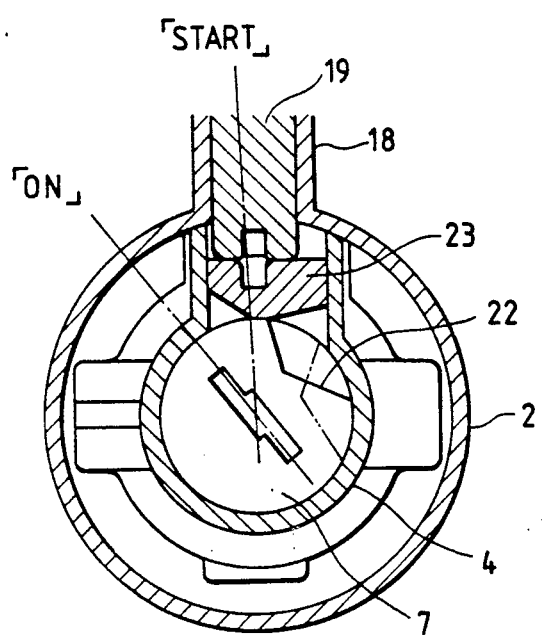
FIG. 9 is a sectional view showing an operating condition different from that shown in FIG. 7.

When the key 5 inserted into the key rotor 7 is turned to the "ACC" position, one of the unlocking position, the lock cam 9 of the cam shaft 8 is as indicated by the solid line in FIG. 1. That is, the movable frame 11 being moved in the direction opposite to the direction of the arrow A (hereinafter referred to as "an opposite direction", when applicable) against the elastic force of the coil spring 12 to the unlocking position, so that the end portion of the lock bar 13 is disengaged from the engaging groove of the steering shaft (not shown); that is, the steering wheel lock device is placed in an unlocking state. Under this condition, the regulating lever 16 is turned in the direction of the arrow B by the elastic force of the torsion spring 17, such that the left end of the regulating lever 16 is engaged with the cam recess 10a (cf. FIG. 3). In addition, when the key 5 is turned to the "ON" and "START" positions, too, the steering wheel lock device is in the unlocking state. On the other hand, when the vehicle is normally traveling, the key rotor 7 is kept at the "ON" position. Under this condition, the slide piece 23 is moved onto the outer cylindrical wall of the key rotor 7 from the cam recess 22 as shown in FIG. 9, so that the depression of the push button 20 is prevented.

Figure 2:
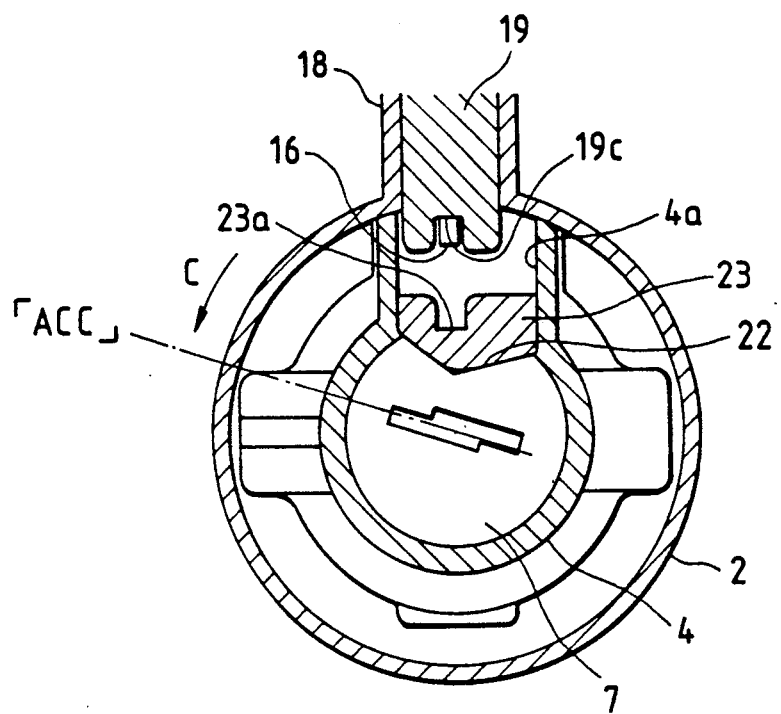
FIG. 2 is a sectional view taken along line II—II in FIG. 1.
Figure 4:
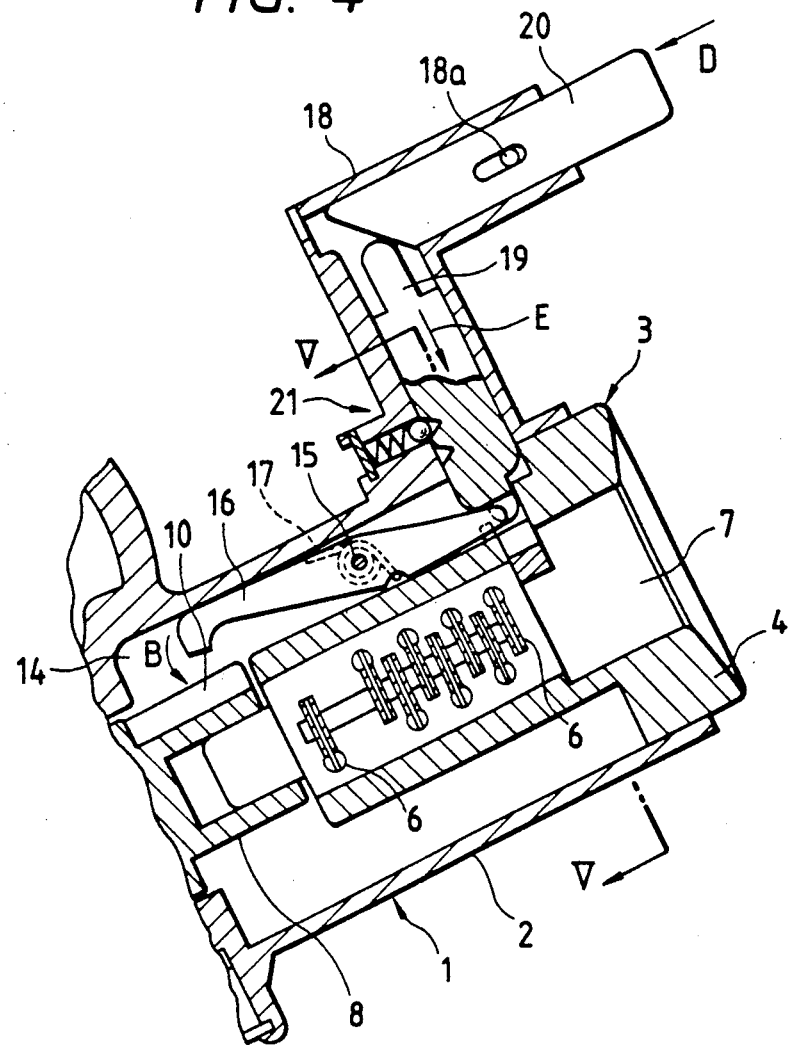
FIG. 4 is a cross sectional view showing another operating condition of the steering wheel device.
Figure 5:
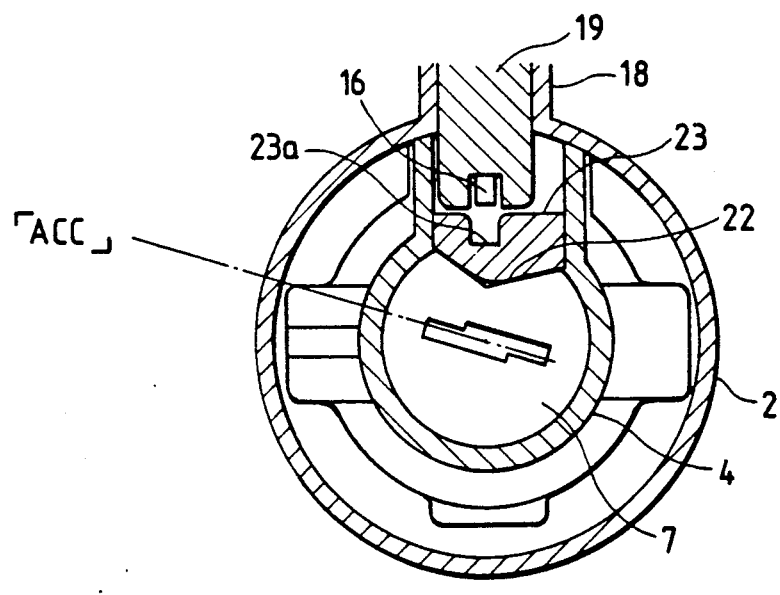
FIG. 5 is a sectional view taken along V—V in FIG. 4.

When, with the vehicle stopped, the key 5 is turned from the "ON" position in the direction of the arrow C until the key rotor 7 comes to the "ACC" position, then the engine is stopped. However, under this condition, the side of the cam protrusion 10b is abutted against the left end portion of the regulating lever 16 as shown in FIG. 3, thus preventing the turning of the key rotor to the "LOCK" position. In addition, in this case, the slide piece 23 is engaged with the cam recess 22 as shown in FIG. 2, the push button 20 can be depressed. When the push button 20 is depressed in the direction of the arrow D, the operating member 19 is slid in the direction of the arrow E. As a result, the ball 21a is disengaged from the recess 19a and then engaged with the recess 19b as shown in FIG. 4. Therefore, this condition is maintained unchanged by the action of the holding means 21 even if the depression of the push button 20 is suspended.

Figure 6:
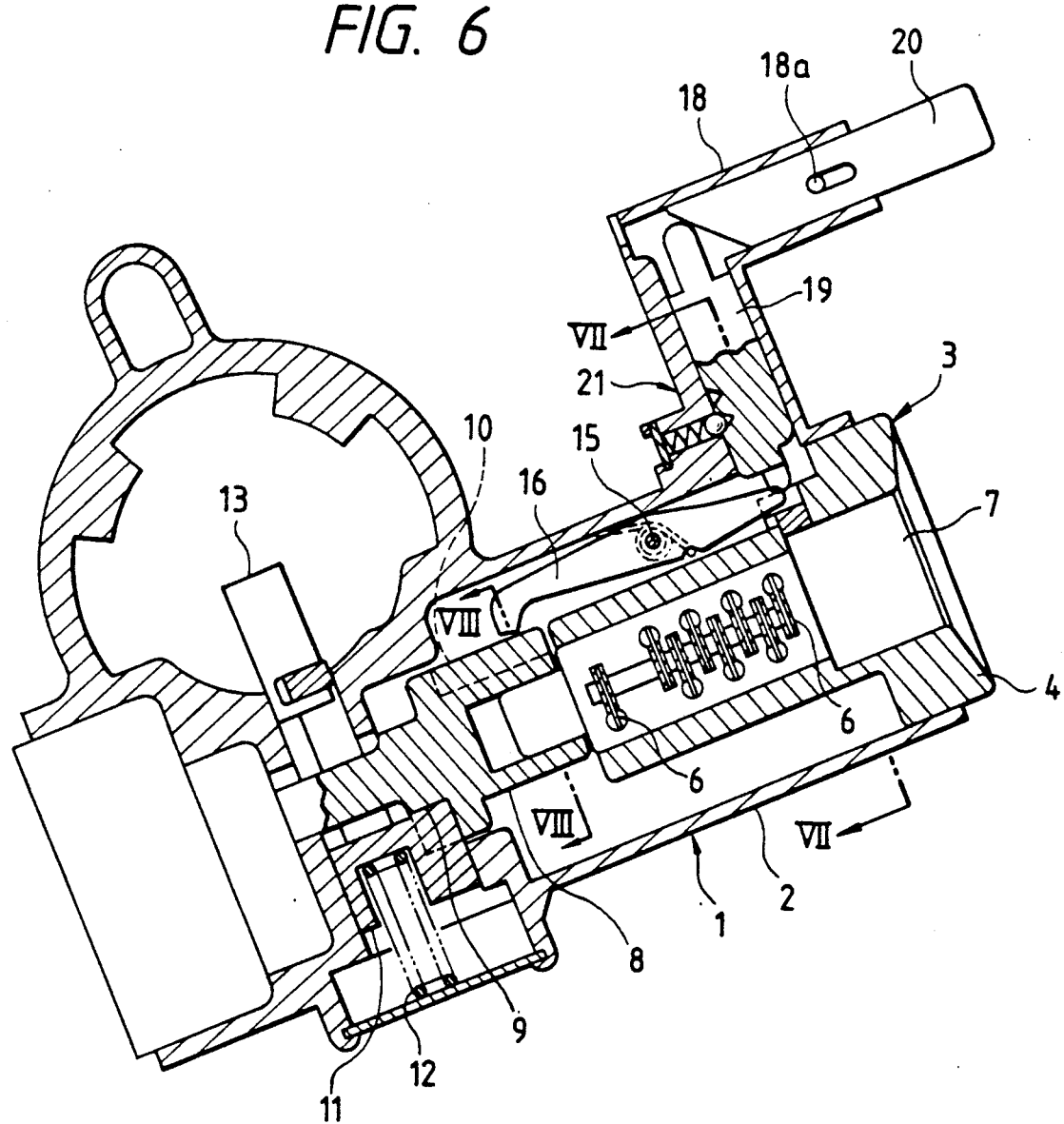
FIG. 6 is a cross sectional view showing another operating condition of the steering wheel lock device.

When the operating member 19 is held as shown in FIG. 4, the regulating lever 16 is turned in the direction opposite to the direction of the arrow B against the elastic force of the torsion spring 17 so that its left end is disengaged from the cam recess 10a of the regulating cam 10; that is, the cam shaft 8 can be turned, since it is released from the regulating lever 16. When, under this condition, the key 5 is operated so as to turn the key rotor 7 from the "ACC" position to the "LOCK" position, the lock cam 9 of the cam shaft 8 is held as indicated by the broken line in FIG. 1 and by the solid line in FIG. 6. As a result, the movable frame 11 and the lock bar 13 are moved in the direction of the arrow A, so that the end portion of the lock bar 13 is engaged with the engaging groove of the steering shaft (not shown); that is, the steering shaft is locked.

Figure 7:
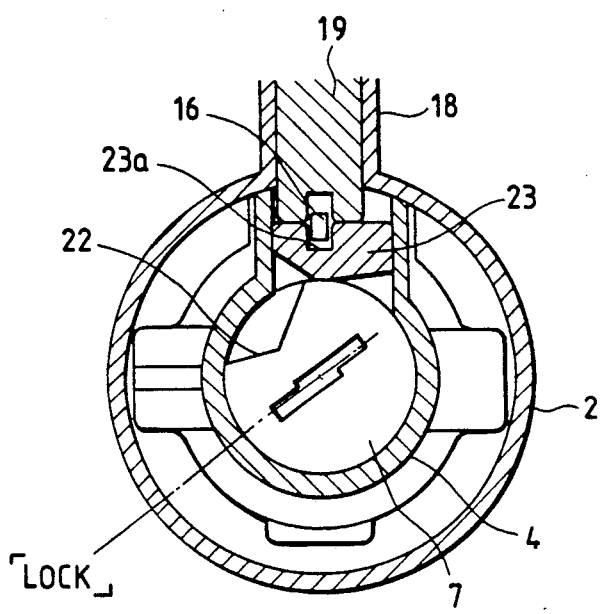
FIG. 7 is a sectional view taken along line VII—VII in FIG. 6.
Figure 8:
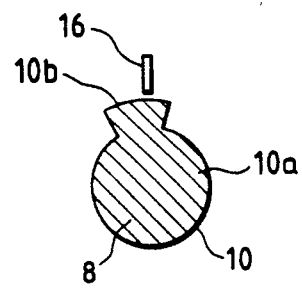
FIG. 8 is a sectional view taken along line VIII—VIII in FIG. 6.

When the key rotor 7 is turned to the "LOCK" position, the slide piece 23 is disengaged from the cam recess 22 and held as shown in FIG. 7. Therefore, the operating member 19 is returned in the direction opposite to the direction of the arrow E, so that the ball 21a is disengaged from the recess 19b and engaged with the recess 19a. Under this "LOCK" condition, the key 5 can be removed from the key rotor 7. Furthermore, in this case, the left end of the regulating lever 16 regulates nothing, since it is held on the outer cylindrical wall of the regulating cam 10. Therefore the key rotor 7 can be turned from the "LOCK" position to the "ACC" position with the key 5 inserted thereinto.

With the steering wheel lock device thus constructed, when the operating member 19 is moved by depressing the push button with the key rotor at the unlocking position, then even after completion of the movement, the operating member 19 is maintained held there by the holding means 21. Therefore, the left end of the regulating lever 16 is disengaged from the cam recess 10a of the regulating cam 10, thus allowing the key rotor 7 to turn from the unlocking position (ACC) to the locking position (LOCK). Hence, it is unnecessary to perform the rotation of the key rotor 7 and the depression of the push button 20; i.e., the movement of the operating member 19 at the same time. In other words, the key rotor can be turned after the operation of the operating member 19. Thus, the steering wheel lock device is simple in operation and excellent in operability.

In the above-described embodiment, the lock cylinder 4 of the key cylinder 3 is separable from the housing 1, and therefore the key cylinder 3 can be replaced as one unit when necessary. However, the technical concept of the invention is applicable to a steering wheel lock device in which the lock cylinder 4 is integral with the housing 1.

Further, when the operating member is moved to the predetermined position with the key rotor at the unlocking position, the operating member is held there by the holding means, as a result of which the one end portion of the regulating lever is disengaged from the cam recess of the regulating cam, thus allowing rotation of the key rotor from the unlocking position to the locking position. Hence, it is not always necessary to perform the movement of the operating member and the rotation of the key rotor at the same time. That is, the key rotor may be turned after the movement of the operating member. Thus, the steering wheel lock device of the invention is simpler in operation, and excellent in operability.

As is apparent from the above description, in the steering wheel lock device according to the invention, a dual operation is effected on a forward portion of the housing 1 where the slide piece 23 is provided. It is sufficient that the lock cam 9 has only a connecting function. Therefore, extreme precision in the axial position of lock cam 9 is unnecessary. Thus, the defects of the prior art are solved.

It will be apparent to those skilled in the art that various modifications and variations can be made in the steering wheel lock device of the present invention and in the construction of this steering wheel lock device without departing from the scope or spirit of the invention. As an example, in the present invention, the key cylinder 3 can be replaced by a new one as one unit, if necessary. When a key is to turn unsuitably and the key rotor 7 receives a damage, the key cylinder is exchanged by a new one as one unit so that the exchanging cost can be reduced to the minimum level.

If the key cylinder is not a common part for a unit, a shape of the housing 1 must be changed according to a kind of a vehicle. However, since the same type unit is used commonly, the production cost can be reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A steering wheel lock device comprising:
a housing;
a key rotor having an outer cylindrical wall, said key rotor being rotatable with respect to said housing and allowed to turn from a locking position in which a steering wheel is locked to an unlocking position in which a steering wheel is unlocked upon insertion of a key into said key rotor, wherein said key can be inserted into or removed from said key rotor while said key rotor is in the locking position;
a cam shaft coupled to said key rotor so as to be rotated in association with said key rotor, said cam shaft having opposite end portions, and a lock cam formed at one end portion of said cam shaft and a regulating cam formed at an end portion opposite said one end portion;

a lock member which is reciprocated between said locking position and said unlocking position in association with said lock cam;

a regulating lever rotatably provided in said housing in such a manner that, when said key is in the locking position, one end portion of said regulating lever is disengaged from a cam recess of said regulating cam, thus permitting rotation of said key rotor, and when said key rotor is turned to the unlocking position, said regulating lever is turned in one direction by a spring means so that said one end portion of said regulating lever is confronted with said cam recess of said regulating cam, thus preventing the turning of said key rotor from the unlocking position to the locking position;

an operating member provided in said housing in such a manner that said operating member is confronted with the other end portion of said regulating lever, and that, when said operating member is moved, said regulating lever is turned in a direction opposite said one direction against the elastic force of said spring means so that said one end portion of said regulating lever is disengaged from said cam recess of said regulating cam, thus allowing rotation of said key rotor from the unlocking position to the locking position;

holding means provided in said housing which holds said operating member at a predetermined position upon movement of said operating member from an original position thereof to said predetermined position; and means provided in said housing for causing said operating member to return from said predetermined position to said original position against the holding means.

2. A steering wheel lock device according to claim 1, wherein said holding means comprises a ball and spring.

3. A steering wheel lock device according to claim 1, wherein said means for causing said operating member to return from said predetermined position to said original position against the holding means comprises:

a slide piece which is moved towards the outer cylindrical wall of said key rotor by turning said key rotor to the locking position.

* * * * *